No. 882,508. PATENTED MAR. 17, 1908.
H. WOMMELSDORF.
STATIC INFLUENCE ELECTRIC MACHINE.
APPLICATION FILED APR. 27, 1906.
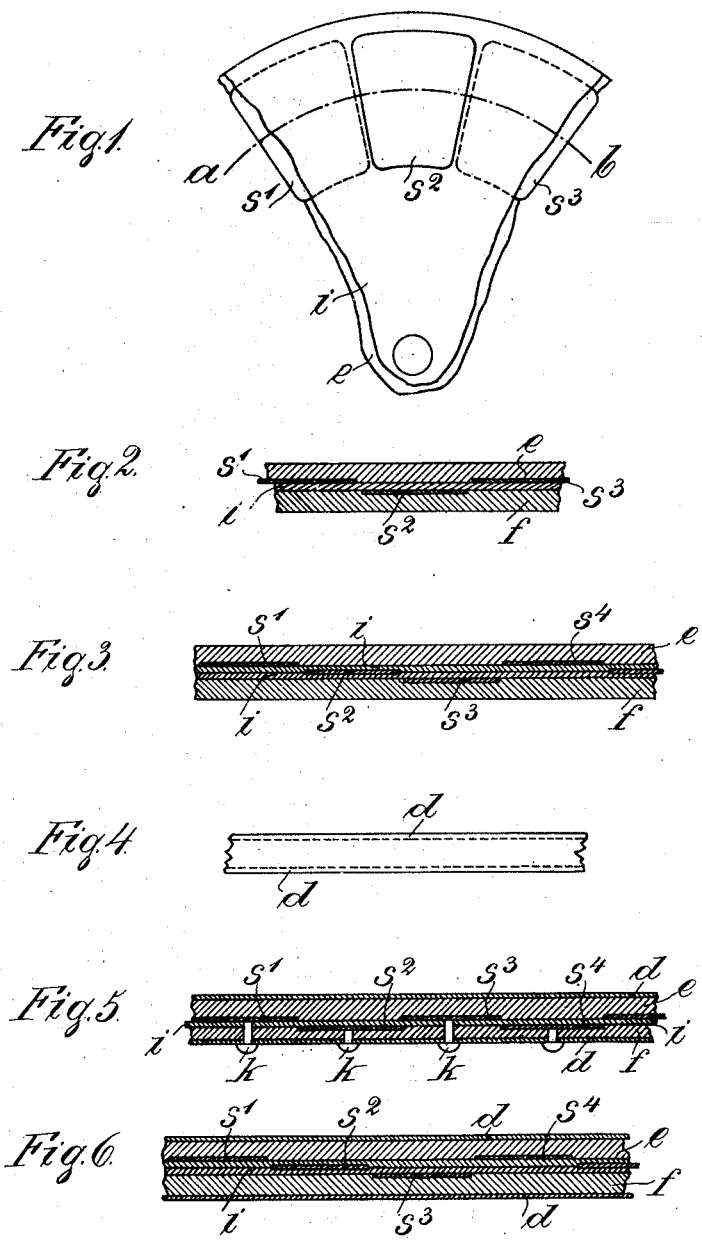
Witnesses:
Carl Ruß
Emil Kayser.
Inventor:
Heinrich Wommelsdorf.
by
Attorney.

UNITED STATES PATENT OFFICE.

HEINRICH WOMMELSDORF, OF CHARLOTTENBURG, GERMANY.

STATIC-INFLUENCE ELECTRIC MACHINE.

No. 882,508.      Specification of Letters Patent.      Patented March 17, 1908.

Application filed April 27, 1906. Serial No. 314,011.

*To all whom it may concern:*

Be it known that I, HEINRICH WOMMELSDORF, a subject of the King of Prussia, German Emperor, and resident of 15 Fraunhoferstrasse, Charlottenburg, near Berlin, German Empire, engineer, have invented certain new and useful Improvements in Static-Influence Electric Machines, of which the following is an exact specification.

My invention relates to improvements in static influence electric machines (influence and multiple or condenser machines) and is intended to provide a machine by means of which the quantity of electricity produced per revolution of the energizing plate is highly increased over the arrangements which have become known hitherto.

As known in machines of the aforementioned type the metallic inductors or carriers or sectors are secured either to an insulating disk or embedded between two insulating plates lying closely upon each other. In the former case the inductors are in contact in part with air or a gaseous fluid and in the latter case the inductors or carriers are inclosed by the solid insulating material.

Experiments have shown that where the number of sectors in the disk has been considerable and equal the following results have been obtained in the following cases:

Firstly, when the sectors are in contact with the atmosphere, *i. e.* in the case where the sectors are pasted on to the disks, the greatest quantity of electricity is obtained when an accurately determined area of sectors is employed and an accurately determined interval occurs between them. Secondly, in the case of the inducting sectors being inclosed in the body of the insulating material experiment has shown that the amount of electricity produced is increased if the surface of the conductors is increased and their distance apart diminished. These comparisons are of course made on the assumption that the number of inducting sectors employed remains the same in both cases.

By increasing the surface adjacent conductors are brought very close together so that the tension on the dielectric becomes very severe. To make the dielectric capable of withstanding such high tensions it has been found necessary to manufacture it by rolling, as casting the disk around the sectors does not produce such a good dielectric and is exceedingly difficult to effect in practice. When however the conductors or influence carriers are arranged between two disks and the whole united by pressure there is always a line of weakness in the dielectric between adjacent conductors in a circumferential direction and the object of the present invention is to overcome the difficulties associated with influence or condenser machines of this kind by making the line of weakness in the disk sufficiently long to prevent the passage of an electric charge between the parts or pressed together layers of the dielectric or disk. This result is obtained by interposing a non-conductor in the direct path *i. e.* the geometrical straight-line between adjacent conductors in a circumferential direction and such interposition may be effected in various ways but I shall describe only one as an example.

Figure 1 is a fragmentary side view of an energizing plate according to my invention. Fig. 2 is a fragmentary sectional cross view on line $a$—$b$ of Fig. 1. Fig. 3 shows a further modification in a fragmentary cross section. Fig. 4 is a fragmentary side-view of an energizing plate provided with an external protective layer. Figs. 5 and 6 show the disk-constructions according to Figs. 2 and 3 respectively in connection with the aforementioned protective layer.

In the figures $e$ and $f$ designate the plates or disks of insulating material, and $s$ the metallic inductors or carriers or sectors, which are perfectly inclosed by the said disks $e$ and $f$; $i$ is the insulating material situated between the sectors $s$, and being made so as to increase the extension of the separating surfaces between two successive disks $s$ $s$.

A very convenient constructional form in view to an easy, cheap and exact production, is illustrated in the Figs. 1 and 2. In this structure two successive inductors of tin foil or thin metal sheet are arranged on different sides of an insulating disk $i$, thus effecting that an electric discharge from the one sector $s'$ must pass by a longer way to the third sector $s^3$.

In Fig. 3 a constructional form is shown, in which instead of one insulating plate $i$ several plates separating the inductors, carriers or sectors are situated one above the other thus causing that the first inductor $s'$ is followed taken along the separating face by the fourth sector $s^4$.

In order to impart to the plate, built up of a number of parts, a greater mechanical rigidity, it is preferable to produce the disks $e$ and $f$ and the intermediate layer of non-vulcanized india-rubber, rolled in plate form, to provide them with inductors, to join and then to compress and vulcanize the parts. The said parts can also be made of any other insulating material and can be combined strongly with each other by any suitable means. The electricity is taken off from the inductors, carriers or sectors preferably by means of metallic studs $k$ (as seen in Fig. 5) or as usual in condenser machines by metal bars projecting through the plates and touching the inductors. Practice with such plates of ebonite have shown that while the disks are prevented from becoming useless by interior discharge, the disks nevertheless become useless for another reason. By reason of the electrical discharge on the back on the disk, i. e. by the gases produced thereby, and consisting of ozone and oxids of nitrogen, a gradual chemical decomposition of the face of the ebonite occurs, whereby the back sides are rendered current conducting, and the induction machine is rendered useless. Also in using other insulating material, having excellent mechanical and electrical properties, similar defects occur.

In order to be enabled notwithstanding to use such materials for the production of plates, owing to the fact that experiments have demonstrated that the decomposition of the plates practically takes place only on the surface, the plates according to this invention are provided with a layer $d$ (to be seen in Figs. 4, 5 and 6), the surface of which keeps its insulating power continuously or for a longer time than the surface of the plate itself.

Many attempts have shown that preferably such a layer is made of a thin celluloid disk, fixed to the plate of ebonite by a suitable binding means, or in any other way. In other cases it is sufficient to apply the insulating material having the higher capacity of resistance in the form of a solution and then to dry it. For example the ebonite plate can be coated with zapon or a solution of camphor or celluloid in acetone, amyl-acetate and the like, whereby a plate is produced having a greater constancy than the plates consisting only of ebonite.

This process differs essentially, with regard to the purpose intended, as well as to the means employed, from the known lacquering of the glass plates of the induction machines. These plates, as known, are coated with a shellac dissolution in order to prevent them from becoming covered with moisture at their surfaces. In this case on the contrary the glass is the body which is indecomposable or indestructible, and the shellac is the body which is rendered gradually useless and current-conducting by the electrical discharging, that is to say by the gases produced thereby. In no case a glass surface continuously maintaining its insulating power could be exceeded by a lacquer coating in this view, whereas in the present invention the contrary takes place.

Having thus fully described the nature of my invention, what I desire to secure by Letters Patent of the United States is:—

1. In an influence machine, a disk consisting of two insulating side-plates, conducting inductors or sectors situated between the side-plates, and of an insulating plate carrying alternatively the inductors following one to the other in tangential direction, on different sides.

2. In an influence machine, a disk consisting of two insulating side-plates, and provided on its outside with a layer, the face of which layer retains its insulating power under the influence of electrical discharge or of the gases produced thereby, continuously or for a longer time than the surface of the disk, conducting inductors or sectors situated between the side-plates and of an insulating plate carrying alternatively the inductors following one to the other in tangential direction, on different sides.

3. In an influence machine, a disk consisting of two side-plates of ebonite and provided on its outside with a layer of celluloid, conducting inductors or sectors situated between said side-plates and of an insulating plate carrying alternatively the inductors following one to the other in tangential direction, on different sides.

4. In an influence machine a disk consisting of a plurality of insulating plates arranged one above the other, and conducting conductors or carriers or sectors following one upon the other in a circle, two successive sectors being situated between different insulating plates.

5. In an influence machine, a disk consisting of a layer on the outside of the disk, the face of which layer retains its insulating power under the influence of electrical discharge or of the gases produced thereby continuously or for a longer time than the surface of the disk, a plurality of insulating plates arranged one above the other and conducting sectors following one upon the other in a circle, two successive sectors being situated between different insulating plates.

6. In an influence machine, a disk consisting of a plurality of ebonite plates, arranged one above the other, conducting sectors following one upon the other in a circle, two successive sectors being situated between different ebonite plates, and a layer on the outside of the disk, the face of which layer retains its insulating power under the influence of electrical discharge or of the gases produced thereby continuously or for a longer time than the surface of the disk, and which layer consists of celluloid.

In witness whereof I have hereunto set my hand in the presence of two witnesses.

HEINRICH WOMMELSDORF.

Witnesses:
    HENRY HASPER,
    WOLDEMAR HAUPT.